United States Patent
Ward

(10) Patent No.: US 11,260,949 B2
(45) Date of Patent: Mar. 1, 2022

(54) MARINE VESSEL STATION KEEPING SYSTEMS AND METHODS

(71) Applicant: Brunswick Corporation, Mettawa, IL (US)

(72) Inventor: Aaron J. Ward, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 269 days.

(21) Appl. No.: 16/391,751

(22) Filed: Apr. 23, 2019

(65) Prior Publication Data

US 2019/0248462 A1    Aug. 15, 2019

Related U.S. Application Data

(63) Continuation of application No. 15/138,860, filed on Apr. 26, 2016, now Pat. No. 10,322,787.

(Continued)

(51) Int. Cl.
| | | |
|---|---|---|
| *B63H 25/42* | (2006.01) | |
| *G05D 1/02* | (2020.01) | |
| *B63H 25/04* | (2006.01) | |

(52) U.S. Cl.
CPC ............. *B63H 25/42* (2013.01); *B63H 25/04* (2013.01); *G05D 1/0208* (2013.01); *B63H 2025/045* (2013.01)

(58) Field of Classification Search
None
See application file for complete search history.

(56) References Cited

U.S. PATENT DOCUMENTS

| | | |
|---|---|---|
| 2,360,361 A | 10/1944 | Mountbatten |
| 2,585,502 A | 2/1952 | Schneider |

(Continued)

FOREIGN PATENT DOCUMENTS

| | | |
|---|---|---|
| CA | 2279165 | 1/2001 |
| CA | 2282064 | 1/2001 |

(Continued)

OTHER PUBLICATIONS

Gonring, "System and Method for Controlling Course of a Marine Vessel," Unpublished U.S. Appl. No. 15/415,095, filed Jan. 25, 2017.

(Continued)

*Primary Examiner* — Navid Ziaeianmehdizadeh
(74) *Attorney, Agent, or Firm* — Andrus Intellectual Property Law, LLP

(57) ABSTRACT

A system for maintaining a marine vessel in a body of water at a selected position and orientation includes a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

20 Claims, 5 Drawing Sheets

Related U.S. Application Data

(60) Provisional application No. 62/301,887, filed on Mar. 1, 2016.

(56) References Cited

U.S. PATENT DOCUMENTS

| | | | |
|---|---|---|---|
| 2,775,328 A | 12/1956 | Yokel |
| 3,145,683 A | 8/1964 | Kolb et al. |
| 3,177,348 A | 4/1965 | Daniloff |
| 3,187,704 A | 6/1965 | Shatto et al. |
| 3,673,553 A | 6/1972 | Miura et al. |
| 3,688,252 A | 8/1972 | Thompson |
| 3,707,717 A | 12/1972 | Frielinghaus |
| 3,715,571 A | 2/1973 | Braddon |
| 3,730,126 A | 5/1973 | Zunderdorp et al. |
| 3,771,483 A | 11/1973 | Bond |
| 4,009,678 A | 3/1977 | North |
| 4,220,111 A | 9/1980 | Krautkremer et al. |
| 4,253,149 A | 2/1981 | Cunningham et al. |
| 4,257,718 A | 3/1981 | Rosa et al. |
| 4,428,052 A | 1/1984 | Robinson et al. |
| 4,513,378 A | 4/1985 | Antkowiak |
| 4,519,335 A | 5/1985 | Krautkremer et al. |
| 4,691,659 A | 9/1987 | Ito et al. |
| 4,769,773 A | 9/1988 | Shatto |
| 4,939,661 A | 7/1990 | Barker et al. |
| 4,975,709 A | 12/1990 | Koike |
| 5,031,561 A | 7/1991 | Nilsson |
| 5,090,929 A | 2/1992 | Reiben |
| 5,108,325 A | 4/1992 | Livingston et al. |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A | 2/1996 | Robertson et al. |
| 5,735,718 A | 4/1998 | Ekwall |
| 5,736,962 A | 4/1998 | Tendler |
| 5,755,605 A | 5/1998 | Asberg |
| 5,884,213 A | 3/1999 | Carlson |
| 6,059,226 A | 5/2000 | Cotton et al. |
| 6,092,007 A | 7/2000 | Cotton et al. |
| 6,142,841 A | 11/2000 | Alexander et al. |
| 6,230,642 B1 | 5/2001 | McKenney et al. |
| 6,234,853 B1 | 5/2001 | Lanyi et al. |
| 6,273,771 B1 | 8/2001 | Buckley et al. |
| 6,308,651 B2 | 10/2001 | McKenney et al. |
| 6,354,892 B1 | 3/2002 | Staerzl |
| 6,357,375 B1 | 3/2002 | Ellis |
| 6,377,889 B1 | 4/2002 | Soest |
| 6,386,930 B2 | 5/2002 | Moffet |
| 6,431,928 B1 | 9/2002 | Aarnivuo |
| 6,446,003 B1 | 9/2002 | Green et al. |
| 6,447,349 B1 | 9/2002 | Fadeley et al. |
| 6,485,341 B1 | 11/2002 | Lanyi et al. |
| 6,511,354 B1 | 1/2003 | Gonring et al. |
| 6,604,479 B2 | 8/2003 | McKenney et al. |
| 6,611,737 B1 | 8/2003 | El-Tahan et al. |
| 6,623,320 B1 | 9/2003 | Hedlund |
| 6,677,889 B2 | 1/2004 | Van Rees et al. |
| 6,678,589 B2 | 1/2004 | Robertson et al. |
| 6,705,907 B1 | 3/2004 | Hedlund |
| 6,707,414 B2 | 3/2004 | Van Rees et al. |
| 6,712,654 B1 | 3/2004 | Putaansuu |
| 6,757,606 B1 | 6/2004 | Gonring |
| 6,848,382 B1 | 2/2005 | Bekker |
| 6,978,729 B2 | 12/2005 | Bertetti et al. |
| 6,994,046 B2 | 2/2006 | Kaji et al. |
| 6,995,527 B2 | 2/2006 | Depasqua |
| RE39,032 E | 3/2006 | Gonring et al. |
| 7,131,385 B1 | 11/2006 | Ehlers et al. |
| 7,140,315 B2 | 11/2006 | Okuyama |
| 7,220,153 B2 | 5/2007 | Okuyama |
| 7,261,605 B2 | 8/2007 | Misao et al. |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,389,735 B2 | 6/2008 | Kaji et al. |
| 7,398,742 B1 | 7/2008 | Gonring |
| 7,416,458 B2 | 8/2008 | Suemori et al. |
| 7,429,202 B2 | 9/2008 | Yazaki et al. |
| 7,455,557 B2 | 11/2008 | Mizutani |
| 7,467,595 B1 | 12/2008 | Layni et al. |
| 7,476,134 B1 | 1/2009 | Fell et al. |
| 7,538,511 B2 | 5/2009 | Samek |
| 7,561,886 B1 | 7/2009 | Conring et al. |
| 7,577,526 B2 | 8/2009 | Kim et al. |
| 7,630,798 B2 | 8/2009 | Mossman et al. |
| 7,727,036 B1 | 6/2010 | Poorman et al. |
| 7,813,844 B2 | 10/2010 | Gensler et al. |
| 7,876,430 B2 | 1/2011 | Montgomery |
| 7,883,383 B2 | 2/2011 | Larsson |
| 8,050,630 B1 | 11/2011 | Arbuckle |
| 8,082,100 B2 | 12/2011 | Grace et al. |
| 8,145,370 B2 | 3/2012 | Borrett |
| 8,145,371 B2 | 3/2012 | Rae et al. |
| 8,150,621 B1 | 4/2012 | Phillips et al. |
| 8,155,811 B2 | 4/2012 | Noffsinger et al. |
| 8,215,252 B1 | 7/2012 | Chun |
| 8,265,812 B2 | 9/2012 | Pease |
| 8,326,472 B2 | 12/2012 | Igarashi et al. |
| 8,417,399 B2 | 4/2013 | Arbuckle et al. |
| 8,439,800 B1 | 7/2013 | Bazan et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,622,778 B2 | 1/2014 | Tyers et al. |
| 8,645,012 B2 | 2/2014 | Salmon et al. |
| 8,694,248 B1 | 4/2014 | Arbuckle et al. |
| 8,761,976 B2 | 6/2014 | Salmon et al. |
| 8,777,681 B1 | 7/2014 | McNalley et al. |
| 8,797,141 B2 | 8/2014 | Best et al. |
| 8,807,059 B1 | 8/2014 | Samples et al. |
| 8,808,041 B2 | 8/2014 | Hine et al. |
| 8,831,868 B2 | 9/2014 | Grace et al. |
| 8,924,054 B1 | 12/2014 | Arbuckle et al. |
| 9,039,468 B1 | 5/2015 | Arbuckle et al. |
| 9,110,467 B2 | 8/2015 | Yuet et al. |
| 9,114,865 B1 | 8/2015 | Gonring |
| 9,132,900 B2 | 9/2015 | Salmon et al. |
| 9,132,903 B1 | 9/2015 | Gable et al. |
| 9,162,743 B2 | 10/2015 | Grace et al. |
| 9,176,215 B2 | 11/2015 | Nikitin et al. |
| 9,183,711 B2 | 11/2015 | Fiorini et al. |
| 9,195,234 B2 | 11/2015 | Stephens |
| 9,248,898 B1 | 2/2016 | Kirchhoff et al. |
| 9,355,463 B1 | 5/2016 | Arambel et al. |
| 9,359,057 B1 | 6/2016 | Arbuckle et al. |
| 9,377,780 B1 | 6/2016 | Arbuckle et al. |
| 9,615,006 B2 | 4/2017 | Terre et al. |
| 9,676,464 B2 | 6/2017 | Johnson et al. |
| 9,694,885 B2 | 7/2017 | Combee |
| 9,729,802 B2 | 8/2017 | Frank et al. |
| 9,733,645 B1 | 8/2017 | Andrasko et al. |
| 9,734,583 B2 | 8/2017 | Walker et al. |
| 9,996,083 B2 | 1/2018 | Vojak |
| 9,904,293 B1 | 2/2018 | Heap et al. |
| 9,927,520 B1 | 3/2018 | Ward et al. |
| 9,952,595 B2 | 4/2018 | Arbuckle et al. |
| 10,055,648 B1 | 8/2018 | Grigsby et al. |
| 10,095,232 B1 | 10/2018 | Arbuckle et al. |
| 10,106,238 B2 | 10/2018 | Sidki et al. |
| 10,191,153 B2 | 1/2019 | Gatland |
| 10,431,099 B2 | 1/2019 | Stewart et al. |
| 10,198,005 B2 | 2/2019 | Arbuckle et al. |
| 10,281,917 B2 | 5/2019 | Tyers |
| 10,322,787 B2 | 6/2019 | Ward |
| 10,338,800 B2 | 7/2019 | Rivers et al. |
| 10,444,349 B2 | 10/2019 | Gatland |

(56) References Cited

U.S. PATENT DOCUMENTS

| | | |
|---|---|---|
| 10,671,073 B2 | 6/2020 | Arbuckle et al. |
| 2003/0137445 A1 | 7/2003 | Van Rees et al. |
| 2003/0191562 A1 | 10/2003 | Robertson et al. |
| 2004/0221787 A1 | 11/2004 | McKenney et al. |
| 2005/0092225 A1 | 5/2005 | Kaji et al. |
| 2005/0164569 A1 | 7/2005 | Kaji et al. |
| 2005/0170713 A1 | 8/2005 | Okuyama |
| 2006/0089794 A1 | 4/2006 | Depasqua |
| 2006/0116796 A1 | 6/2006 | Fossen et al. |
| 2007/0017426 A1 | 1/2007 | Kaji et al. |
| 2007/0032923 A1 | 2/2007 | Mossman et al. |
| 2007/0089660 A1 | 4/2007 | Bradley |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0089654 A1 | 9/2007 | Bradley et al. |
| 2007/0233389 A1 | 10/2007 | Stephens |
| 2008/0027597 A1 | 1/2008 | Barrett et al. |
| 2008/0033603 A1 | 2/2008 | Gensler et al. |
| 2008/0289558 A1 | 11/2008 | Montgomery |
| 2009/0037040 A1 | 2/2009 | Salmon et al. |
| 2009/0076671 A1 | 3/2009 | Mizutani |
| 2009/0171520 A1 | 7/2009 | Kaji |
| 2009/0276148 A1 | 11/2009 | Arvidsson |
| 2010/0023192 A1 | 1/2010 | Rae et al. |
| 2010/0034594 A1 | 2/2010 | Major |
| 2010/0070124 A1 | 3/2010 | Yeager et al. |
| 2010/0076683 A1 | 3/2010 | Chou |
| 2010/0109944 A1 | 5/2010 | Whitehead et al. |
| 2010/0138083 A1 | 6/2010 | Kaji |
| 2010/0145558 A1 | 6/2010 | Kaji |
| 2011/0153126 A1 | 6/2011 | Arbuckle et al. |
| 2011/0166724 A1 | 7/2011 | Hiramatsu |
| 2011/0288714 A1 | 11/2011 | Flohr et al. |
| 2012/0072059 A1 | 3/2012 | Glaeser |
| 2012/0129410 A1 | 5/2012 | Tyers |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2014/0114509 A1 | 4/2014 | Venables et al. |
| 2014/0362661 A1 | 12/2014 | Muijzert et al. |
| 2015/0032304 A1 | 1/2015 | Nakamura et al. |
| 2015/0089427 A1 | 3/2015 | Akuzawa |
| 2015/0277442 A1 | 10/2015 | Ballou |
| 2015/0321740 A1 | 11/2015 | Bradley et al. |
| 2015/0346722 A1 | 12/2015 | Herz et al. |
| 2015/0346730 A1 | 12/2015 | Stephens et al. |
| 2016/0016651 A1 | 1/2016 | Anderson et al. |
| 2016/0039500 A1 | 2/2016 | Heyring et al. |
| 2016/0061980 A1 | 3/2016 | Tonchia et al. |
| 2016/0101838 A1 | 4/2016 | Kojima |
| 2016/0125739 A1 | 5/2016 | Stewart et al. |
| 2016/0214534 A1 | 7/2016 | Richards et al. |
| 2016/0246300 A1 | 8/2016 | Langford-Wood |
| 2016/0252907 A1 | 9/2016 | Parkinson |
| 2016/0299507 A1 | 10/2016 | Shah et al. |
| 2016/0334792 A1 | 11/2016 | Jopling |
| 2017/0139426 A1 | 5/2017 | Ito et al. |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0253314 A1 | 9/2017 | Ward |
| 2017/0255200 A1 | 9/2017 | Arbuckle et al. |
| 2017/0255201 A1 | 9/2017 | Arbuckle et al. |
| 2017/0277189 A1 | 9/2017 | Johnson et al. |
| 2017/0349257 A1 | 12/2017 | Hara et al. |
| 2017/0365175 A1 | 12/2017 | Harnett |
| 2018/0015994 A1 | 1/2018 | Kishimoto et al. |
| 2018/0057132 A1 | 3/2018 | Ward et al. |
| 2018/0106619 A1 | 4/2018 | Johnson et al. |
| 2018/0231980 A1 | 8/2018 | Arbuckle et al. |
| 2018/0259338 A1 | 9/2018 | Stokes et al. |
| 2018/0259339 A1 | 9/2018 | Johnson et al. |
| 2018/0284815 A1 | 10/2018 | Cui et al. |
| 2019/0251356 A1 | 8/2019 | Rivers |
| 2019/0258258 A1 | 8/2019 | Tyers |
| 2019/0286169 A1 | 9/2019 | Cui et al. |
| 2019/0291839 A1 | 9/2019 | Hirst |
| 2019/0359300 A1 | 11/2019 | Johnson et al. |
| 2020/0062366 A1 | 2/2020 | Murata |

FOREIGN PATENT DOCUMENTS

| | | |
|---|---|---|
| DE | 906907 | 3/1954 |
| EP | 0423901 | 4/1991 |
| EP | 816962 | 7/1998 |
| EP | 2161542 | 3/2010 |
| EP | 2952994 | 12/2015 |
| GB | 1173442 | 12/1969 |
| GB | 2180374 | 3/1987 |
| JP | S5835480 | 3/1983 |
| JP | 58061097 | 4/1983 |
| JP | H0325094 | 2/1991 |
| JP | H04101206 | 2/1992 |
| JP | 05-203638 | 8/1993 |
| JP | H06286694 | 10/1994 |
| JP | 07223591 | 8/1995 |
| JP | 2926533 | 7/1997 |
| JP | 11-129978 | 5/1999 |
| JP | 2001-287697 | 10/2001 |
| JP | 2002-178990 | 6/2002 |
| JP | 2002173091 | 6/2002 |
| JP | 2003276677 | 10/2003 |
| JP | 2004042884 | 2/2004 |
| JP | 2004355105 | 12/2004 |
| JP | 2005046034 | 2/2005 |
| JP | 2005-200004 | 7/2005 |
| JP | 2005212693 | 8/2005 |
| JP | 2005231407 | 9/2005 |
| JP | 2006137309 | 6/2006 |
| JP | 2007248336 | 9/2007 |
| JP | 2008201225 | 9/2008 |
| JP | 2009-227035 | 10/2009 |
| JP | 2009-241738 | 10/2009 |
| JP | 2009-538782 | 11/2009 |
| JP | 2011128943 | 6/2011 |
| JP | 5042906 | 7/2012 |
| JP | 2012528417 | 11/2012 |
| JP | 5226355 | 7/2013 |
| JP | 2014065495 | 4/2014 |
| KR | 20060072293 | 6/2006 |
| WO | WO 1992005505 | 4/1992 |
| WO | WO 2006058400 | 6/2006 |
| WO | WO 2008111249 | 8/2008 |
| WO | WO 2014033457 | 3/2014 |
| WO | WO 2016104031 | 6/2016 |
| WO | WO 2017095235 | 6/2017 |
| WO | 2017167905 | 10/2017 |
| WO | 2018162933 | 9/2018 |
| WO | 2018183777 | 10/2018 |
| WO | 2018201097 | 11/2018 |
| WO | 2018232376 | 12/2018 |
| WO | 2018232377 | 12/2018 |
| WO | 2019096401 | 5/2019 |
| WO | 2019126755 | 6/2019 |
| WO | 2019157400 | 8/2019 |
| WO | 2019201945 | 10/2019 |

OTHER PUBLICATIONS

Arbuckle et al., "Methods for Positioning Marine Vessels," Unpublished U.S. Appl. No. 16/028,019, filed Jul. 5, 2018.

Arbuckle et al., "Station Keeping Methods," Unpublished U.S. Appl. No. 15/425,184, filed Feb. 6, 2017.

Arbuckle et al., "Vessel Maneuvering Methods and Systems," Unpublished U.S. Appl. No. 15/437,233, filed Feb. 20, 2017.

Arbuckle et al., "System and Method for Controlling a Position of a Marine Vessel Near an Object," Unpublished U.S. Appl. No. 15/818,233, filed Nov. 20, 2017.

Arbuckle et al., "System and Method for Controlling a Position of a Marine Vessel Near an Object," Unpublished U.S. Appl. No. 15/818,226, filed Nov. 20, 2017.

(56) References Cited

OTHER PUBLICATIONS

Poorman et al., Multilayer Control System and Method for Controlling Movement of a Marine Vessel, Unpublished U.S. Appl. No. 11/965,583, filed Dec. 27, 2007.
Extended EP Search Report in corresponding EP Application No. 17020040, dated Jul. 31, 2017.
Japanese Office Action in corresponding JP Application No. 2017-018562, dated Jun. 27, 2017.
Japanese Office Action in corresponding jP Application No. 2017-018562, dated Sep. 20, 2017.
Mercury Marine, Axius Generation 2 Installation Manual, Jul. 2010, pp. 22-25.
Mercury Marine, Joystick Piloting for Outboards Operation Manual, 2013, pp. 24-26.
Mercury Marine, Zeus 3000 Series Pod Drive Models Operation Manual, 2013, pp. 49-52.

MARINE VESSEL STATION KEEPING SYSTEMS AND METHODS

CROSS REFERENCE TO RELATED APPLICATION

This application is a continuation of U.S. application Ser. No. 15/138,860, filed Apr. 26, 2016, which claims the benefit of U.S. Provisional Application Ser. No. 62/301,887, filed Mar. 1, 2016, both of which applications are hereby incorporated by reference herein.

FIELD

The present disclosure relates to systems and methods for controlling a position and an orientation of a marine vessel in a body of water.

BACKGROUND

U.S. Pat. No. 6,273,771, which is hereby incorporated by reference in entirety, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068, which is hereby incorporated by reference in entirety, discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928, which is hereby incorporated by reference in entirety, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,924,054, which is hereby incorporated by reference in entirety, discloses systems and methods for orienting a marine vessel having a marine propulsion device. A control circuit controls operation of the marine propulsion device. A user input device inputs to the control circuit a user-desired global position and a user-desired heading of the marine vessel. The control circuit calculates a position difference between the user-desired global position and an actual global position of the marine vessel and controls the marine propulsion device to minimize the position difference. The control circuit controls the marine propulsion device to orient an actual heading of the marine vessel towards the user-desired global position when the position difference is greater than a threshold. When the position difference is less than the threshold, the control circuit controls the marine propulsion device to minimize a difference between the actual heading and the user-desired heading while minimizing the position difference.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for maintaining a marine vessel in a body of water at a selected position and a selected orientation is disclosed. A global positioning system (GPS) on the marine vessel determines a global position and a heading of the marine vessel with respect to Earth's geographic coordinate system. A proximity sensor on the marine vessel determines a relative position and a bearing of the marine vessel with respect to an object near the marine vessel. A controller is operable in a station keeping mode and is in signal communication with the GPS and the proximity sensor. The controller chooses between using global position and heading data from the GPS and relative position and bearing data from the proximity sensor to determine if the marine vessel has moved from one or both of the selected position and the selected orientation. In the station-keeping mode, the controller thereafter calculates thrust commands required to return the marine vessel to the selected position and the selected orientation and outputs the thrust commands to a marine propulsion system, which uses the thrust commands to reposition the marine vessel at the selected position and the selected orientation.

According to a further example of the present disclosure, a method for maintaining a marine vessel in a body of water at a selected position and a selected orientation is disclosed. The method includes accepting an input to initiate a station keeping mode of a control system of the marine vessel and using a proximity sensor on the marine vessel to determine if an object is within a given range of the marine vessel. In response to the object being within the given range of the marine vessel, the method includes obtaining a relative position and a bearing of the marine vessel with respect to the object with the proximity sensor, and thereafter using relative position and bearing data from the proximity sensor to determine if the marine vessel subsequently moves from one or both of the selected position and the selected orientation. In response to the object not being within the given range of the marine vessel, the method includes obtaining a global position and a heading of the marine vessel using a global positioning system (GPS), and thereafter using global position and heading data from the GPS to determine if the marine vessel subsequently moves from one or both of the selected position and the selected orientation. The method further includes using a difference between the selected position and the selected orientation and an actual position and an actual orientation, as determined from the relative position and bearing data or the global position and heading data, as appropriate, to calculate thrust commands that will return the marine vessel to the selected position and the selected orientation. The method additionally includes outputting the thrust commands to a marine propulsion system, which uses the thrust commands to reposition the marine vessel at the selected position and the selected orientation.

BRIEF DESCRIPTION OF DRAWINGS

Examples of systems and methods for controlling position and orientation of a marine vessel are described with reference to the following Figures. The same numbers are used throughout the Figures to reference like features and like components.

DETAILED DESCRIPTION OF DRAWINGS

In the present description, certain terms have been used for brevity, clearness and understanding. No unnecessary limitations are to be implied therefrom beyond the requirement of the prior art because such terms are used for descriptive purposes only and are intended to be broadly construed.

FIGS. 1-4 and 6 schematically depict various embodiments of marine vessels and control systems for orienting and maneuvering the marine vessels. It should be understood that the particular configurations of the marine vessels, propulsion systems, and control systems shown and described are exemplary. It is possible to apply the concepts described in the present disclosure with substantially different configurations therefor. For example, the marine vessels that are depicted have two or three marine propulsion devices. However, it should be understood that the concepts of the present disclosure are applicable to marine vessels having any number of marine propulsion devices. Additionally, although the present disclosure describes the propulsion devices as being stern drives, other arrangements such as an inboard arrangements, outboard arrangements, pod arrangements, etc. using propellers, impellers, jets, or the like can be controlled according to the same principles and methods. The control systems described herein include certain operational structures such as global positioning system (GPS) devices and inertial measurement units (IMUs). It should be understood that the concepts disclosed in the present disclosure are capable of being implemented with different types of systems for acquiring global position data and are not limited to the specific types and numbers of such devices described and depicted herein. Further, the present disclosure describes certain types of user input devices. It should also be recognized that the concepts disclosed in the present disclosure are also applicable in a preprogrammed format without user input, or in conjunction with different types of user input devices, as known to one of skill in the art. Further equivalents, alternatives and modifications are possible as would be recognized by those skilled in the art.

Figure 6:
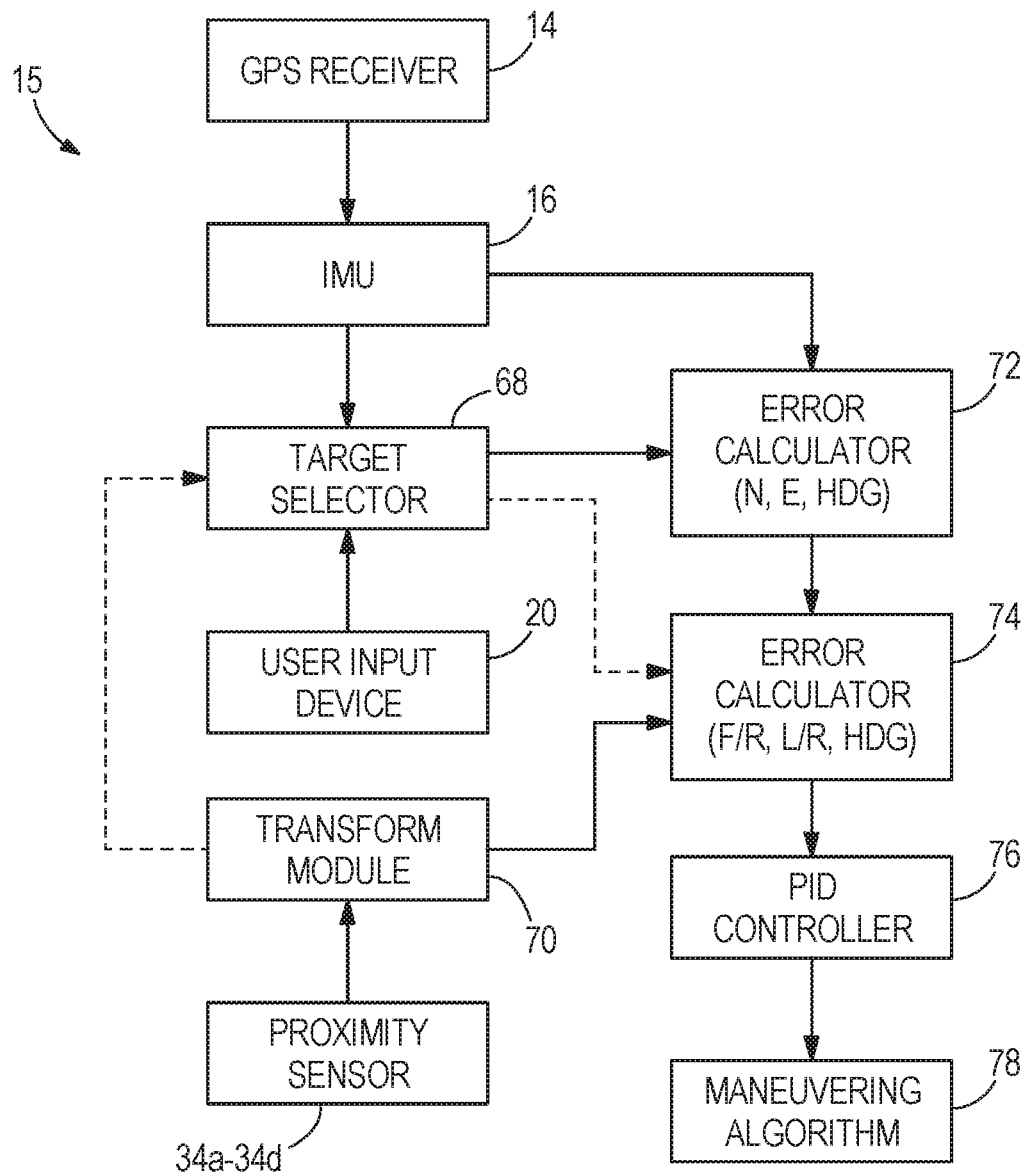
FIG. 6 schematically illustrates a system for controlling position and orientation of a marine vessel according to the present disclosure.

U.S. Pat. No. 7,305,928, incorporated by reference herein above, describes how a marine vessel can be made to move in the following manners: to sidle with no movement in either a forward or reverse direction and no rotation (see FIGS. 2 and 3 of the '928 patent and accompanying description); to move in a forward direction with no side movement and no rotation (see FIG. 4 of the '928 patent and accompanying description); to cause a combined movement with both a linear force and a moment exerted on the marine vessel (FIG. 6 of the '928 patent and accompanying description); or to rotate with no linear movement in either a forward/reverse or a left/right direction (FIG. 6 alternative). The '928 patent further describes how these types of motions and different thrusts can be requested by moving a handle of a joystick forward, backward, side-to-side, or at an angle, by rotating the handle of the joystick, or by combining joystick translation and rotation. The '928 patent also describes how a controller can be programmed to cause associated marine propulsion devices to move and produce thrust as if they are being controlled by a joystick according to a station keeping function, which maintains the marine vessel at a desired global position and desired heading. The devices and methods described in the '928 patent for initiating, carrying out, and cancelling the station keeping function form the foundation for the presently disclosed systems and methods for maintaining a marine vessel in a selected position and at a selected orientation within a body of water.

Figure 1:
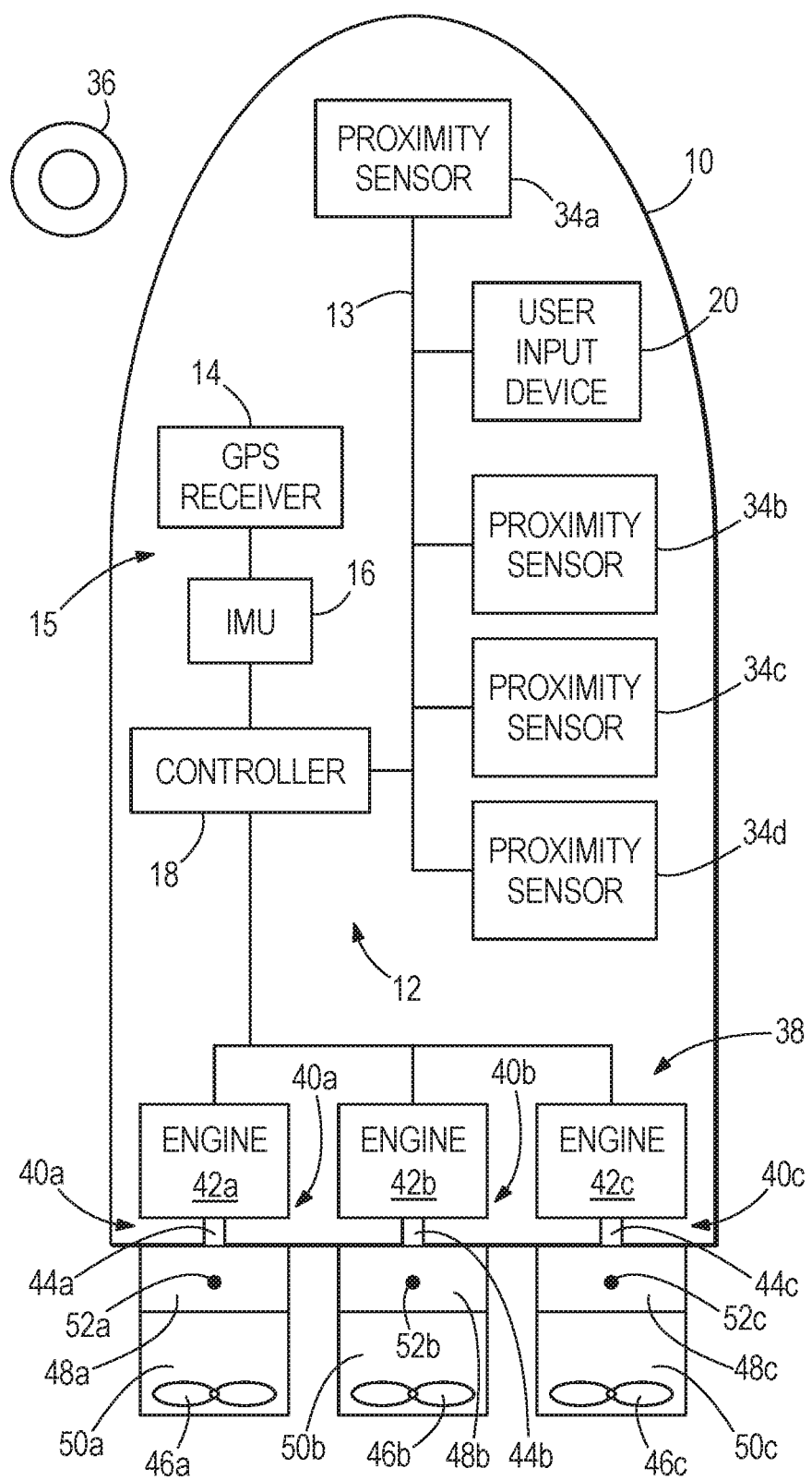
FIG. 1 shows an exemplary marine vessel with an exemplary propulsion control system.

FIG. 1 is a schematic representation of a marine vessel 10 having a control system 12 which is configured to perform the steps of an exemplary method for maintaining a marine vessel in a selected position and orientation within a body of water. The marine vessel 10 is provided with a global positioning system (GPS) 15 including a GPS receiver 14 which is located at a preselected position on the marine vessel 10 and provides information related to the global position of the marine vessel 10 in terms of latitude and longitude. The global positioning system 15 also includes an inertial measurement unit (IMU) 16 in communication with the GPS receiver 14. The IMU 16 can be, for example, part 8M0048162 available from Mercury Marine of Fond du Lac, Wis. In certain embodiments of the IMU 16, it comprises a differential correction receiver, accelerometers, angular rate sensors, and a microprocessor which manipulates the information obtained from these devices to provide information relating to the current position of the marine vessel 10, in terms of longitude and latitude, the current heading of the marine vessel 10 with respect to north, and the velocity and acceleration of the marine vessel 10 in six degrees of freedom.

The control system 12 also includes at least one proximity sensor 34a on the marine vessel 10. In contrast to the GPS 15 (including GPS receiver 14 and IMU 16), which determines a global position and a heading of the marine vessel 10 with respect to Earth's geographic coordinate system, the proximity sensor 34a determines a relative position and a bearing of the marine vessel 10 with respect to an object 36 near the marine vessel 10. The object 36 can be anything in, under, or near the water, such as a buoy, dock, shoreline, seawall, etc. Ideally, the object 36 has enough physical variance that it can provide a three-dimensional picture to the proximity sensor 34a such that the proximity sensor 34a can tell one part of the object 36 from another part of the object 36. In the example shown, there is at least one additional proximity sensor 34b, 34c, 34d on the marine vessel 10 that provides additional relative position and bearing data with respect to the object 36, and the controller 18 accounts for the relative position and bearing data from all proximity sensors 34a-34d to determine the position of the marine vessel 10 with respect to the object 36. The proximity sensors 34a-34d can all be of the same type, or can be of varied types. More than one sensor of a particular type may be provided, and sensors may be provided at locations other than those shown herein. Fewer or more sensors than shown can also be provided.

One or more of the proximity sensors 34a-34d can be a sonar device, which measures the distance of the marine vessel 10 to the object 36 by converting the time from transmission to reception of a sound pulse into a range based on the speed of sound. To measure the bearing of the object 36 with respect to the marine vessel 10, the relative arrival time to several hydrophones may be measured, or a process known to those of skill in the art as beamforming may be used. One or more of the proximity sensors 34a-34d can be a LiDAR device, which measures the amount of time it takes for emitted laser pulses to bounce back from the object 36, and converts this to a range given the speed of light. Different methods may be used to measure bearing using a LiDAR device, one of which includes using detectors arranged in quadrants to calculate a centroid of the returned light beam, which can be used to determine the angle of the light returned from the object 36. In yet another example, one or more of the proximity sensors 34a-34d can be a radar device, which determines the range to the object 36 by measuring the amount of time required for a reflected echo to return. Bearing to the object 36 may be determined by the direction from which the reflected echo returns.

FIG. 1 also shows a controller 18 that is operable in a station keeping mode and in signal communication with the GPS 15 and the proximity sensors 34a-34d. One having ordinary skill in the art will recognize that the controller 18 can have many different forms and is not limited to the example that is shown and described. For example, here the controller 18 carries out the station keeping method and controls the propulsion system 38 as will be described herein below, but in other examples separate propulsion control modules and/or thrust vector control modules can be provided for each propulsion device. Thus, portions of the methods described herein can be carried out by a single controller or by several separate controllers. Additionally, each controller can have one or more control sections or control units. In some examples, the controller 18 may include a computing system that includes a processing system, storage system, software, and input/output (I/O) interfaces for communicating with devices such as those shown in FIGS. 1 and 6. The processing system loads and executes software from the storage system, such as software programmed with a station keeping method. When executed by the computing system, station keeping software directs the processing system to operate as described herein below in further detail to execute the station keeping method. The computing system may include one or many application modules and one or more processors, which may be communicatively connected. The processing system can comprise a microprocessor and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 18 communicates with one or more components of the control system 12 via a communication link 13, which can be a wired or wireless link. The controller 18 is capable of monitoring and controlling one or more operational characteristics of the control system 12 and the propulsion system 38 and their various subsystems by sending and receiving control signals via the communication link 13. In one example, the communication link 13 is a controller area network (CAN) bus, such as described in U.S. Pat. No. 6,273,771, but other types of links could be used. It should be noted that the extent of connections of the communication link 13 shown herein is for schematic purposes only, and the communication link 13 in fact provides communication between the controller 18 and each of the sensors, devices, and various subsystems described herein, although not every connection is shown in the drawing for purposes of clarity.

The controller 18 receives inputs from devices such as the GPS receiver 14, the IMU 16, the proximity sensors 34a-34d, and a user input device 20, which allows the operator of the marine vessel 10 to provide manually selectable modes of operation. As some examples, the user input device 20 can be an input screen, a button, a keypad, a gauge, or the like that allows the operator of the marine vessel to manually select various modes of operation associated with the marine vessel 10. One of those selections made by the operator of the marine vessel can provide an enabling signal which informs the controller 18 that the operator desires to operate the marine vessel 10 in a station keeping mode in order to maintain the position of the marine vessel in a selected position and at a selected orientation in the body of water in which the marine vessel 10 is operating. In other words, the operator can use the user input device 20 to activate the present system so that the marine vessel 10 is maintained at a selected position (e.g., a selected longitude and latitude or a selected position relative to an object 36) and a selected orientation (e.g., heading with respect to due north or bearing with respect to the object 36), as will be described further herein below. In one example, as described in the '928 patent, a joystick (not shown) must be in a neutral position when the user input device 20 is actuated in order for the control system 12 to enter the station keeping mode.

According to the present disclosure, the controller 18 chooses between using global position and heading data from the GPS 15 and relative position and bearing data from the proximity sensors 34a-34d to determine if the marine vessel 10 has moved from one or both of the selected position and the selected orientation. Each of these examples will be described below with respect to FIGS. 2-4. While in the station-keeping mode, the controller 18 thereafter calculates thrust commands required to return the marine vessel 10 to the selected position and the selected orientation and outputs the thrust commands to the marine propulsion system 38, which uses the thrust commands to reposition the marine vessel 10 at the selected position and the selected orientation.

The marine propulsion system 38 includes a plurality of marine propulsion devices 40a, 40b, 40c coupled to a rear half of the marine vessel 10. The marine propulsion devices 40a-40c shown herein are stern drives, but as noted above could be other types of devices. Each marine propulsion device in the plurality of marine propulsion devices 40a, 40b, 40c has an engine 42a, 42b, 42c rotating an output shaft 44a, 44b, 44c at an engine speed. Propulsors 46a, 46b, 46c are coupled in torque transmitting relationship with each respective output shaft 44a, 44b, 44c and produce thrust to propel the marine vessel 10. The propulsors 46a-46c shown herein are propellers, but could be other types of propulsors as noted above. Such coupling is provided by way of a series of shafts and a transmission 48a, 48b, 48c controlling the provision and direction of torque transmission between each output shaft 44a, 44b, 44c and each propulsor 46a, 46b, 46c in forward, neutral, or reverse. The shafts and transmissions may be provided in respective gear cases or protective coverings 50a, 50b, 50c for each propulsion device 40a, 40b, 40c. Each propulsion device 40a-40c has a generally vertical steering axis 52a, 52b, 52c with respect to which the propulsor 46a-46c is rotatable in order to vary a direction of the thrust produced by the propulsor. The thrust commands include a steering angle of each propulsor 46a-46c about its respective steering axis 52a-52c, the direction of torque transmission between each output shaft 44a-44c and its respective propulsor 46a-46c, and the engine speed of each respective engine 42a-42c for each respective marine propulsion device 40a, 40b, 40c in the plurality of marine propulsion devices. As mentioned above, these specific commands can be calculated by and provided from the controller 18, or can be calculated by and provided from separate thrust vector control and propulsion control modules.

Figure 2:
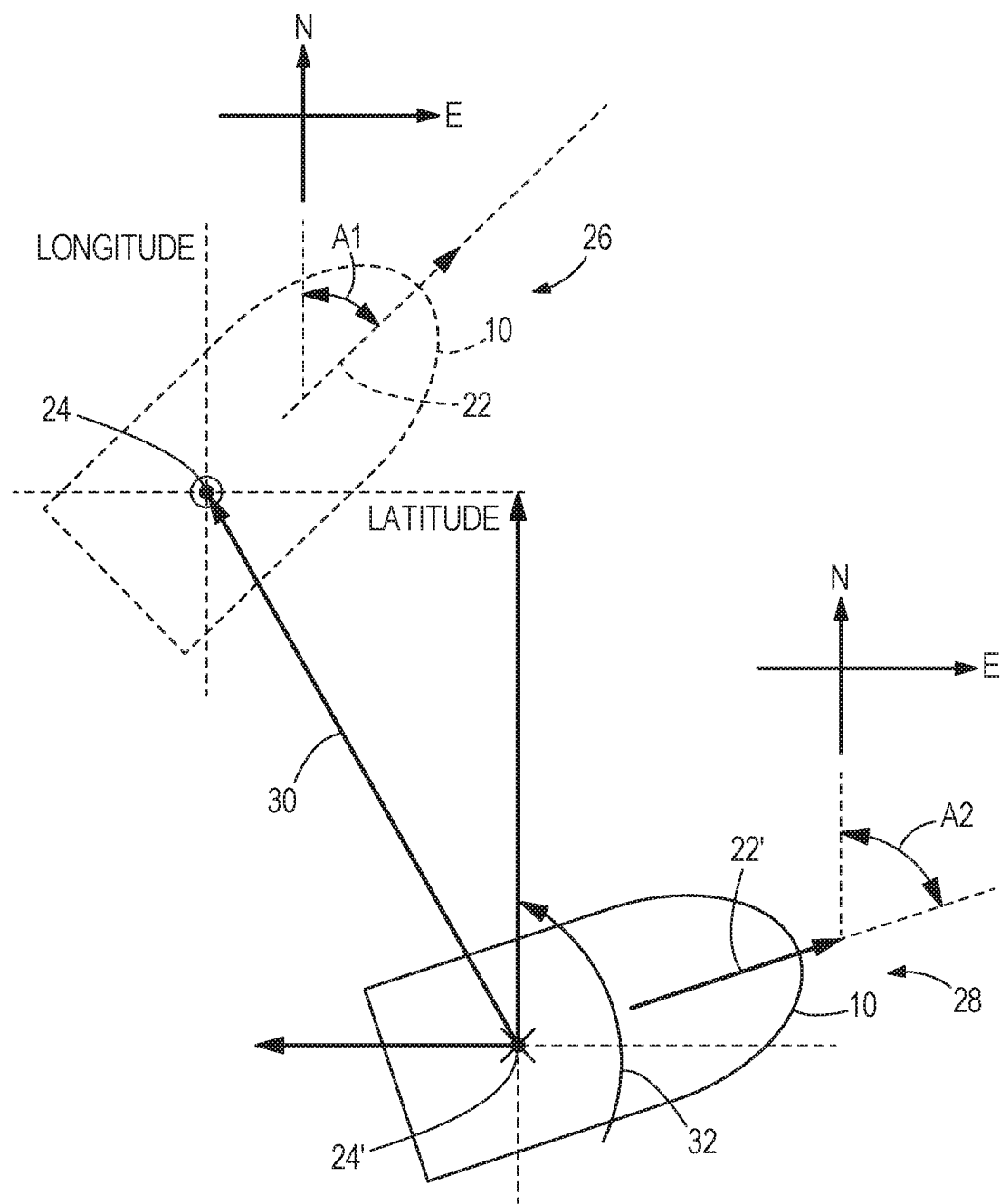
FIG. 2 is a schematic representation of a marine vessel at two different positions and orientations.
Figure 3:
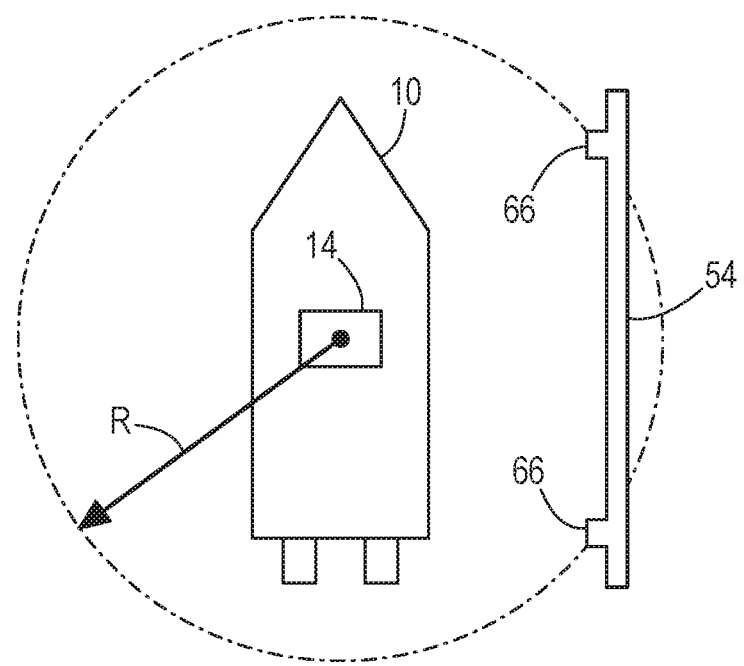
FIG. 3 is a schematic representation of a marine vessel near a dock.

FIG. 2 shows a marine vessel 10 at an initial global position 26, measured as longitude and latitude, and an initial heading represented by angle A1 between the heading vector 22 of the marine vessel 10 and a due north vector N. In one example, the controller 18 sets the initial global position 26 and the initial heading A1 as the selected position and the selected orientation upon initiation of the station keeping mode. This may be in response to an object 36 not being within a given range of the marine vessel 10. In other words, if after station keeping is initiated via the user input device 20, the proximity sensors 34a-34d do not sense an object 36 within range, the controller 18 will set the initial global position and heading of the marine vessel 10 as the selected position and orientation. The GPS receiver 14 and the IMU 16 determine the information relating to the global position and heading of the marine vessel 10. For exemplary purposes, the position and heading will be described in terms of the position of a center of gravity 24 of the marine vessel 10 and a heading vector 22 which extends through the center of gravity 24. However, it should be understood that alternative locations on the marine vessel 10 can be used for these purposes. The IMU 16 provides a means by which this location on the marine vessel 10 can be selected.

FIG. 2 also shows the marine vessel 10 with the global position of its center of gravity 24' moved to a location represented by a subsequent global position 28 of the marine vessel 10. In addition, in the subsequent global position 28, the marine vessel 10 is illustrated as having rotated slightly in a clockwise direction so that its heading vector 22' is now defined by a larger angle A2 with respect to the due north vector N. In one example, the subsequent position and orientation are defined by an actual global position 28 and an actual heading A2 of the marine vessel 10. It should be understood that the difference in position between the selected initial global position 26 and the subsequent actual global position 28 is significantly exaggerated so that the response by the control system 12 can be clearly described. In one example, the controller 18 determines a difference between a selected position, such as the initial global position 26, and the actual position, such as the subsequent global position 28, that resulted from the marine vessel 10 drifting. This drift of the marine vessel 10 can occur because of wind, tide, current, or the like.

The controller 18 compares the actual global position 28 and heading A2 of the marine vessel 10 to the previously-stored selected global position 26 and heading A1. An error, or difference, in the north/south, east/west, and heading framework is computed as the difference between the selected global position 26 and heading A1 and the actual global position 28 and heading A2. This error, or difference, is then converted to an error, or difference, in the forward/reverse, right/left, and heading framework of the marine vessel 10, which is sometimes referred to as the body framework. These vessel framework error elements are then used by the station keeping software, which attempts to simultaneously null the error, or difference, elements. For example, through the use of a PID controller, the controller 18 computes a desired force in the fore/aft and left/right directions with reference to the marine vessel 10, along with a desired yaw moment relative to the marine vessel 10 in order to null the error elements. The computed force and moment elements are then transmitted to the marine propulsion system 38 described above, which delivers the requested forces and moments by rotating the independently steerable marine propulsion devices 40a-40c about their steering axes 52a-52c, controlling the power provided to the propulsors 46a-46c of each device by controlling the speed of each engine 42a-42c, and controlling the thrust vector directions of the marine propulsion devices via the transmissions 48a-48c.

For example, the controller 18 may determine that the difference between the selected global position 26 and the actual global position 28 can be reduced if the marine vessel 10 is subjected to an exemplary target linear thrust 30 and a target moment 32. The target linear thrust 30 and the target moment 32, in a preferred embodiment, are achieved by a manipulation of the marine propulsion devices 40a-40c as described above. The target linear thrust 30 will cause the marine vessel 10 to move towards its initial, or selected, global position 26, which is measured as a magnitude of longitude and latitude. The target moment 32 will cause the marine vessel 10 to rotate about its center of gravity 24 so that its heading vector 22' moves from the actual global position 28 to the selected global position 26. This reduces the heading angle from the larger magnitude of angle A2 to the smaller magnitude of A1. Both the target linear thrust 30 and target moment 32 are computed to decrease the errors between the actual global position 28 and heading A2 and the selected global position 26 and heading A1.

Using the measured global position and heading of the marine vessel 10, as determined by the GPS 15, may be desirable when the marine vessel 10 is in open water or is not near an object. As mentioned briefly above, in one example, the controller 18 chooses to use the global position and heading data from the GPS 15 if the proximity sensors 34a-34d do not sense an object 36 within a given range upon initiation of the station keeping mode. The lack of an object 36 within a given range (which range may be calibrated into the system or user-selected) indicates that the marine vessel 10 is in open water or not near any objects. Thus, using the global position and heading data from the GPS 15 to calculate the thrust commands to maintain or return the marine vessel 10 to the selected position and orientation is sufficient.

However, GPS receivers do not always have good signals, which may result in the controller 18 not recognizing an error in position or orientation of the marine vessel 10 and therefore not taking subsequent action to correct such error. Additionally, PID filters and control loops used when working with GPS data have built in latency in order to help them remain stable, resulting in slower error detection. Lack of control output or slower control output is likely not detrimental when there are no objects nearby. However, the present inventor has realized through research and development that the lack of (or slower) control output due to GPS inaccuracy prevents the station keeping mode from working reliably near objects such as docks, seawalls, etc., where the marine vessel 10 might hit the object 36. For example, referring to FIG. 3, if the GPS receiver 14 provides fidelity with only, for example, a radius R around the GPS receiver 14, the marine vessel 10 may not be prevented from contacting a seawall or dock 54 within this radius R. In other words, the data from the GPS receiver 14 will indicate to the controller 18 that the marine vessel 10 is at the selected position and selected orientation and no corrective thrust commands are needed, even if the marine vessel 10 is in fact about to hit the dock 54. Because the inherent error in GPS data limits the control resolution to only a few feet (i.e., at the radius R), the marine vessel 10 is difficult to control when disturbance forces are high. The marine vessel 10 must move a few quantization units from the selected position before the controller 18 can react.

Relative position and bearing data from the proximity sensors 34a-34d can be used in order to provide measurement resolution and accuracy much higher than that of the GPS receiver 14. In one example, the controller 18 chooses to use the relative position and bearing data from the proximity sensors 34a-34d if the proximity sensors sense the object 36 or 54 within a given range of the marine vessel 10 upon initiation of the station keeping mode. For example, if the object 36 or dock 54 is within ten meters of the marine vessel 10 upon initiation of the station keeping mode, the controller 18 may choose to use the proximity sensors 34a-34d to set a user-selected position and orientation and to determine subsequent movement from those selections. The given range may be measured from the center of gravity of the marine vessel 10, from the outer edge of the hull, or from the proximity sensor nearest the object 36, 54, depending on system calibration. Here, it is assumed that the proximity sensors 34a-34d are calibrated to determine the distances and bearings with respect to the center of gravity 64, 64' of the marine vessel (FIG. 4) for ease of explanation; however, it should be understood that the different readings from each proximity sensor on the vessel can be accounted for according to other calculations that do not relate the distance and bearing to the center of gravity. Additionally, note that if a plurality of proximity sensors are used, the data they provide can be used to create a virtual map or virtual photograph of the nearby object 36, 54, thereby providing the controller 18 with information regarding whether the sensors are in fact measuring distance to, for example, a post 66 of the dock 54 and, for example, regarding the depth of the post 66, thus leading to more accurate corrective calculations.

Figure 4:
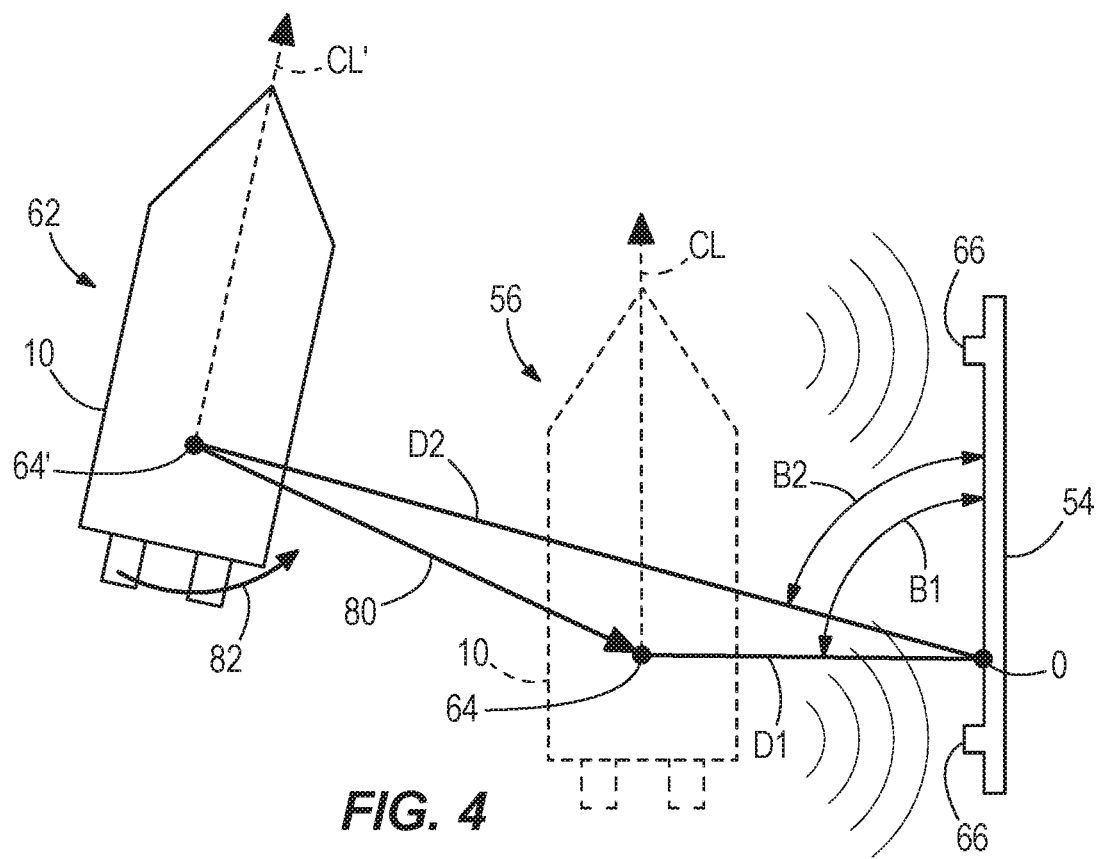
FIG. 4 is a schematic representation of a marine vessel at two different positions and orientations with respect to the dock.

FIG. 4 shows an example of how relative position and bearing data can be used to determine if the marine vessel 10 has moved from the selected position and orientation. For example, an initial relative position of the marine vessel 10 is shown at 56, with the marine vessel 10 having its center of gravity 64 at a distance D1 from the dock 54. The initial bearing B1, measured here as the angle of the center of gravity 64 from a virtual point of origin O on the dock 54, is about 90 degrees. In one example, the initial relative position 56 and the initial bearing B1 can be set by the user as the selected position and the selected orientation in response to the object 36, 54 being within the given range of the marine vessel 10 upon initiation of the station keeping mode. In other words, upon initiation of the station keeping mode by actuation of the user input device 20, the controller 18 will determine if the object 36 (dock 54) is in range, and if so, will save the initial relative position 56 and bearing B1 as the selected position and bearing. In another example, the initial position and bearing can be saved as the selected position and bearing in response to operator input regardless of how close the marine vessel 10 is to the object 36, 54. In either case, because the controller 18 saves both a distance of the center of gravity 64 from the virtual point of origin O and an angle of the center of gravity 64 from the virtual point of origin O, the controller 18 can compute the vessel's position with respect to a second axis, and can save the (x, y) position of the center of gravity 64 with respect to the virtual point of origin O.

The marine vessel 10 may thereafter drift due to the force of wind, waves, current, or the like to a subsequent actual relative position 62, where the marine vessel 10 has a center of gravity 64' at a different distance D2 from the point of origin O on the dock 54 and also at a different bearing B2 with respect to the point of origin O on the dock 54, and therefore a different (x, y) position with respect to the origin O. The controller 18 then compares the actual relative position 62 and bearing B2 of the marine vessel 10 to the previously-stored selected relative position 56 and bearing B1. An error, or difference, in the forward/reverse, right/left, and heading framework of the marine vessel 10 is then computed. These vessel framework error elements are then used by the station keeping software, which attempts to simultaneously null the error, or difference, elements. Through the use of a PID controller, a desired force is computed in the fore/aft and left/right directions with reference to the marine vessel 10, along with a desired yaw moment relative to the marine vessel 10 in order to null the error elements. The computed force and moment elements are then transmitted to the marine propulsion system 38 described above, which delivers the requested forces and moments by positioning the independently steerable marine propulsion devices 40a-40c, controlling the power provided to the propulsors 46a-46c of each device, and controlling the thrust vector directions of the marine propulsion devices 40a-40c, similar to the description provided with respect to control using GPS data.

The difference between the selected relative position 56 and the actual relative position 62 can be reduced if the marine vessel 10 is subjected to an exemplary target linear thrust 80 and a target moment 82. The target linear thrust 80 and the target moment 82, in a preferred embodiment, are achieved by a manipulation of the marine propulsion devices 40a-40b as described above. The target linear thrust 80 will cause the marine vessel 10 to move towards its initial, or selected, relative position 56. The target moment 82 will cause the marine vessel 10 to rotate about its center of gravity 64 so that its orientation with respect to the point of origin O on the dock 54 changes from the actual bearing B2 to the selected bearing B1. Both the target linear thrust 80 and target moment 82 are computed to decrease the errors between the actual relative position 62 and bearing B2 and the selected relative position 56 and bearing B1.

In other examples, while operating in the station keeping mode, the controller 18 may choose to switch from using the global position and heading data from the GPS 15 to using the relative position and bearing data from the proximity sensors 34a-34d in response to the proximity sensors 34a-34d sensing that the marine vessel 10 has come within a predetermined distance of the object 36, 54, which predetermined distance may be user-selected or calibrated. For example, the controller 18 may choose to start using the data from the proximity sensors 34a-34d when the marine vessel 10 comes within five meters of an object 36, 54 due to strong winds, current, or waves. The predetermined distance could alternatively be the same as the given range used to initially decide if the proximity sensor data or the GPS data will be used upon initiation of station keeping mode. The controller 18 may make this switch in a binary manner, such that either GPS data or proximity data is used depending on whether the predetermined distance has been reached. Alternatively, the controller 18 may make the switch slowly, by filtering proximity sensor data into the GPS data over time or as the vessel continues to move closer to the object 36, 54.

Figure 5:
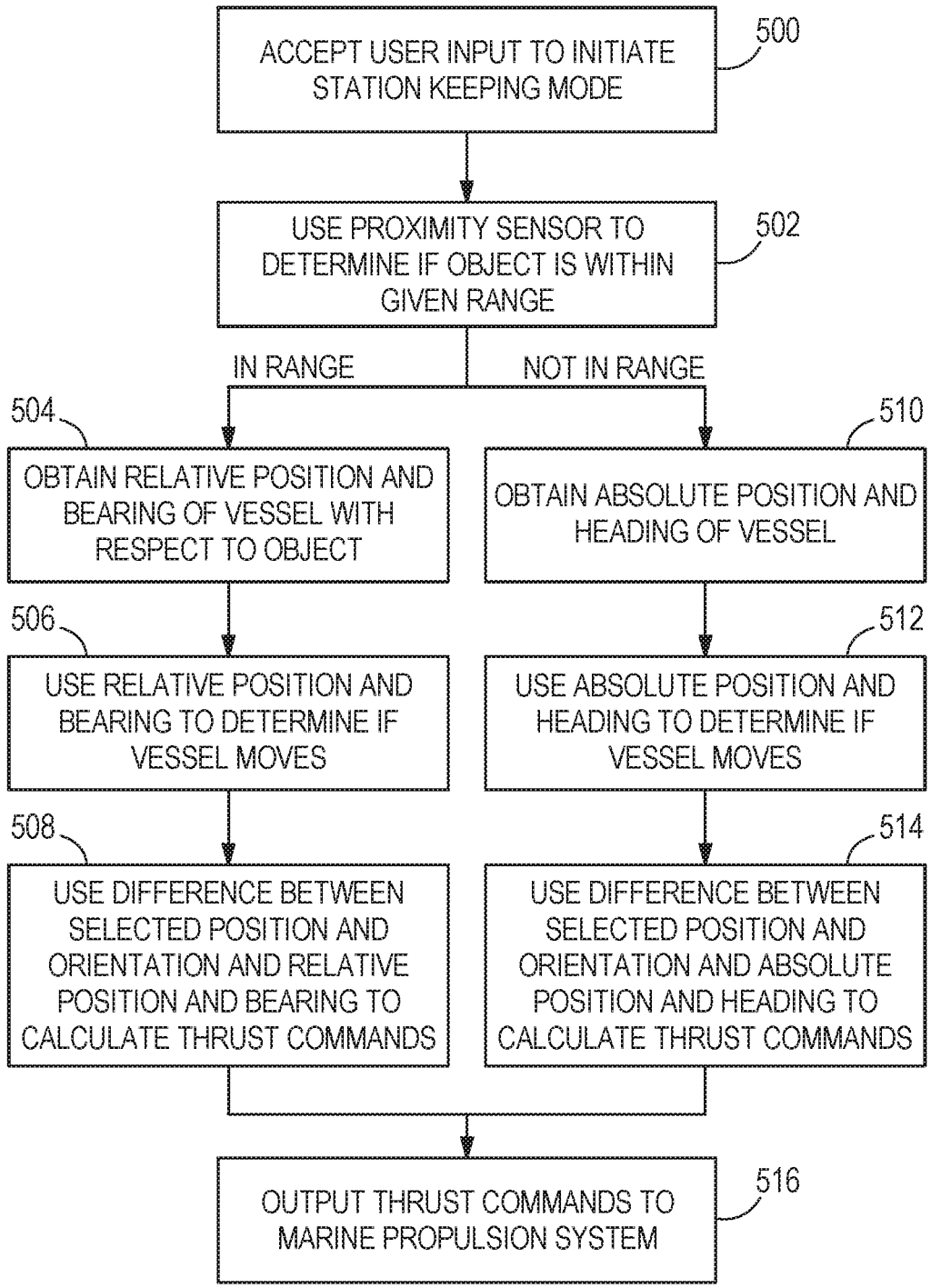
FIG. 5 illustrates a method for controlling position and orientation of a marine vessel according to the present disclosure.

FIG. 5 is a schematic showing a method for maintaining a marine vessel 10 at a selected position and orientation according to the present disclosure. As shown at 500, the method includes accepting an input to initiate a station keeping mode of a control system 12 of the marine vessel 10. This input might be through actuation of the user input device 20, and may or may not require that a joystick be in a neutral position. At 502, the method includes using a proximity sensor 34a on the marine vessel 10 to determine if an object 36, 54 is within a given range of the marine vessel 10. In response to the object 36, 54 being within the given range of the marine vessel 10, the method continues to 504, and includes obtaining a relative position and a bearing of the marine vessel 10 with respect to the object 36, 54 with the proximity sensor 34a. As shown at 506, the method thereafter includes using relative position and bearing data from the proximity sensor 34a to determine if the marine vessel 10 subsequently moves from one or both of the selected position and the selected orientation.

In one example, the method includes utilizing the global position and heading data from the GPS 15 to verify that the proximity sensor 34a is operable, while using the relative position and bearing data to determine if the marine vessel 10 moves from one or both of the selected position and the selected orientation. For instance, if the GPS 15 indicates that the GPS position or heading is changing by a calibrated amount (which is a relatively significant amount) while the proximity sensors 34a-34d report no movement from the selected position and orientation, the controller 18 might determine that the proximity sensors 34a-34d are inoperative. In this instance, the controller 18 may switch to using the GPS data while continuing in station keeping mode, and/or may send an alert to the user to deactivate the station keeping mode and examine the proximity sensors. In another example, the method may include utilizing the global position and heading data from the GPS 15 to determine if the object 36, 54 itself is moving, while using the relative position and bearing data to determine if the marine vessel 10 moves from one or both of the selected position and the selected orientation. This method can be used to determine if the object 36, 54 from which the marine vessel 10 is maintaining a selected distance and bearing is in fact another vessel, in which case the controller 18 may alert the user to deactivate the station keeping mode, and/or may switch to using the GPS data for station keeping instead.

In any of the above examples, the method then continues to 508, and includes using a difference between the selected position and the selected orientation and an actual position and an actual orientation, as determined from the relative position and bearing data, to calculate thrust commands that will return the marine vessel 10 to the selected position and the selected orientation.

On the other hand, in response to the object 36, 54 not being within the given range of the marine vessel 10, as shown at 510, the method includes obtaining a global position and a heading of the marine vessel using the GPS 15, and thereafter using global position and heading data from the GPS 15 to determine if the marine vessel 10 subsequently moves from one or both of the selected position and the selected orientation, as shown at 512. In one example, the method includes ignoring the relative position and bearing data from the proximity sensors 34a-34d after determining that the object 36, 54 is not within the given range and while using the global position and heading data to determine if the marine vessel 10 moves from one or both of the selected position and the selected orientation. In this case, the controller 18 has determined that it will use GPS position and IMU heading for station keeping, and continues to use this data until station keeping mode is deactivated. In contrast, in another example, the method includes using the proximity sensors 34a-34d to detect if the marine vessel 10 subsequently comes within a predetermined distance of the object 36, 54 after determining that the object 36, 54 is not within the given range (at least upon initiation of the station keeping mode) and while using the global position and heading data to determine if the marine vessel 10 moves from one or both of the selected position and the selected orientation. If the marine vessel 10 is within the predetermined distance of the object 36, 54, the controller 18 may filter the relative position and bearing data into the global position and heading data to determine if the marine vessel 10 moves from one or both of the selected position and the selected orientation. This allows the controller 18 to slowly take into account the proximity sensor data depending on how close the object 36, 54 is and/or the speed of the marine vessel 10. Alternatively, the controller 18 can switch immediately to using the proximity sensor data upon determining that the marine vessel 10 is within the predetermined distance of the object 36, 54.

As shown at 514, in any of the above examples, the method next includes using a difference between the selected position and the selected orientation and an actual position and an actual orientation, as determined from the global position and heading data, to calculate thrust commands that will return the marine vessel 10 to the selected position and the selected orientation. In yet another example, the controller 18 uses GPS data to control the position of the marine vessel 10 in one direction (e.g. forward/reverse) with respect to the object 36, 54, and uses proximity data to control the position of the marine vessel 10 in a perpendicular direction (e.g. left/right) with respect to the object 36, 54. This might be helpful if the object does not have defining 3D characteristics (e.g. the posts 66 on the dock 54) that can be mapped by the proximity sensors 34a-34d.

After 508 or 514, as appropriate, the method continues to 516 and includes outputting the thrust commands to a marine propulsion system 38, which uses the thrust commands to reposition the marine vessel 10 at the selected position and the selected orientation.

FIG. 6 is a schematic representation of the devices and software used in conjunction with one example of the control system 12 of the present disclosure. A target selector portion 68 of the software stored in the controller 18 receives inputs from the GPS receiver 14, the IMU 16, the user input device 20, the proximity sensors 34a-34d (via a transform module 70) and a joystick (not shown). When the station keeping mode is enabled by an input from the operator of the marine vessel 10 via the user input device 20, the target selector portion 68 receives a current set of magnitudes from the IMU 16 or the transform module 70 and stores those values as the selected position and the selected orientation of the marine vessel 10. If the system is using the global position and heading data from the GPS 15, the selected position is a set of global coordinates in latitude and longitude and the selected heading is an angle relative to due north. If the system is using the relative position and bearing data from the proximity sensors 34a-34d, the selected position is a distance of the marine vessel 10 from the object 36, 54 and the selected orientation is an angle of the marine vessel 10 with respect to the object 36, 54. The selected position and selected orientation information is then stored in the memory of the controller 18.

When in the station keeping mode, the GPS receiver 14, the IMU 16, and the proximity sensors 34a-34d periodically obtain new data, and provide actual position and actual orientation information to a first error calculator 72 or a second error calculator 74 within the controller 18. For example, the IMU 16 provides the actual global position and actual heading to the first error calculator 72, and the target selector portion 68 provides the selected global position and the selected heading to the first error calculator 72. The first error calculator 72 compares the selected global position and selected heading to actual values of these two variables. The comparison produces a difference magnitude which is defined in terms of a north-south difference and an east-west difference in combination with a heading angular difference. The north-south difference and east-west difference are the net difference in the longitude and latitude positions represented by the selected global position and actual global position. The heading angular difference is the angular difference between angles A2 and A1 (see FIG. 2). This information, which is described in terms of global measurements and which is in reference to stationary global references, is then provided to the second error calculator 74, which resolves those values into forward-reverse, left-right, and heading changes in reference to clockwise and counterclockwise movement of the marine vessel 10.

The second error calculator 74 receives the selected position and selected bearing information from the target selector portion 68, and receives the actual position and the actual bearing from the proximity sensors 34a-34d via the transform module 70. The transform module 70 uses a coordinate transform algorithm to convert the relative position and bearing data from the proximity sensors 34a-34d into vessel framework error data the controller 18 can use to calculate the thrust commands. For example, using the polar-to-Cartesian coordinate transform algorithm, the transform module 70 changes the relative position and bearing data from a distance and bearing with respect to a point of origin O on the object 36, 54 to an (x, y) value and bearing (the difference between angles B2 and B1). This presents the error values as values that correspond to forward-reverse, left-right, and heading changes in reference to clockwise and counterclockwise movement of the marine vessel 10. In one example, the controller 18 sets the initial relative position of the marine vessel 10 upon initiation of the station keeping mode as an x, y coordinate of (0, 0) and sets the initial bearing of the object 36 with respect to the marine vessel 10 as a bearing of 0 degrees such that any subsequent readings from the proximity sensors 34a-34d are in fact the error values. For example, if the marine vessel 10 moves ten meters forward and twelve meters left and rotates clockwise by five degrees due to external forces, the propulsion system 38 will need to provide thrust in an amount and direction to move the marine vessel 10 ten meters back, twelve meters right, and five degrees counter-clockwise. It can be seen then that if the initial position of the vessel is set as (0, 0) with 0 degrees of bearing, the error values can be fed through to the PID controller 76, which uses a closed-loop control algorithm to calculate the thrust commands.

Whether measured initially from GPS data or proximity data, the forward/reverse, left/right, and heading errors are provided from the second error calculator 74 to the PID controller 76. As is generally known to those skilled in the art, a PID controller uses proportional, integral, and derivative techniques to maintain a measured variable at a preselected setpoint. In the proportional band of the controller, the controller output is proportional to the error between the desired magnitude and the measured magnitude. The integral portion of the controller provides a controller output that is proportional to the amount of time that an error, or difference, is present. The derivative portion of the controller provides an output that is proportional to the rate of change of the measurement. Each of the portions, or control strategies, of the PID controller typically uses an individual gain factor so that the PID controller 76 can be appropriately tuned for each particular application. However, it should be understood that specific types of PID controllers and specific gains for the proportional, integral, and derivative portions of the controller are not limiting.

In one example, the PID controller 76 outputs more aggressive thrust commands when the controller 18 is using the relative position and bearing data from the proximity sensors 34a-34d than when the controller 18 is using the global position and heading data from the GPS 15. The PID can be tuned to provide a more precise, quicker response because it does not have to deal with GPS signal error. For example, the gains used for PID control can be greater when calculating the thrust commands based on position and orientation error determined by the proximity sensors because proximity data is generally more accurate than GPS data. The PID controller 76 might use a larger gain factor for the proportional output, for example, to cause the marine vessel 10 to move a greater amount back to the desired position and orientation per feedback loop. In contrast, the gains used when the controller 18 is using the global position and heading data may result in relatively smaller changes and/or relatively slower changes in position and orientation.

Additionally or alternatively, the PID controller 76 might be programmed with deadbands, such that the controller 18 does not calculate the thrust commands to reposition the marine vessel 10 unless one or both of the following are true: (1) a difference between the selected position and the global position or the relative position, as appropriate, is greater than a position error threshold; and (2) a difference between the selected orientation and the heading or the bearing, as appropriate, is greater than an orientation error threshold. The controller may have different deadbands for control when calculating the thrust commands based on position error determined from information provided by the proximity sensors than when calculating the thrust commands based on position error determined from information provided by the GPS. The deadbands might be narrower (i.e., have a lower position error threshold and/or a lower orientation error threshold) when using the relative position and bearing data than when using the global position and heading data, again because the proximity sensors provide greater accuracy that the GPS. Therefore, the controller 18 will respond to smaller margins of error when using the relative position and bearing data than when using the global position and heading data. Thus, the programmed position error threshold and orientation error threshold may be greater when the controller 18 is using the global position and heading data from the GPS receiver 14 than when the controller 18 is using the relative position and bearing data from the proximity sensors 34a-34d.

With continued reference to FIG. 6, the error correction information provided by the PID controller 76 is then used by the maneuvering algorithm 78, which is described in greater detail here in above and in the '928 patent. The maneuvering algorithm 78 receives information describing the required corrective vectors, both the target linear thrust (for example, 30 in FIG. 2 or 80 in FIG. 4) and the target moment (for example, 32 in FIG. 2 or 82 in FIG. 4), necessary to reduce the error or difference between the actual global position (or actual relative position) and heading (or bearing) and the user-selected position and orientation.

It should be recognized that the station keeping mode is not always intended to move the marine vessel 10 by significant distances. Instead, the controller's continual response to slight changes in position and orientation will more likely maintain the marine vessel 10 in position without requiring perceptible movements of the marine vessel 10. In other words, the marine propulsion devices 40a-40c are selectively activated in response to slight deviations in the position and orientation of the marine vessel 10 and, as a result, large corrective moves such as those illustrated in FIGS. 2 and 4 will not normally be required. As a result, the thrusts provided by the marine propulsion devices continually counter the forces on the marine vessel 10 caused by wind, current, and tide so that the net result is an appearance that the marine vessel 10 is remaining stationary and is unaffected by the external forces.

However, alternative examples could be used to cause the marine vessel 10 to move to a position, defined by a user-selected position and orientation, that was previously stored in the memory of the controller 18. Under those conditions, a relatively larger target linear thrust 30, 80 and target moment 32, 82 could be used to move the marine vessel 10 to the initial position 26, 56 when that initial position 26, 56 is selected from the memory and the station keeping mode is enabled. As an example, a user-desired position, such as the position identified by reference numeral 26 or 56, can be stored in the controller 18 and then recalled, perhaps days later, after the operator of the marine vessel has moved the marine vessel 10 to a position in the general vicinity of the stored user-selected position 26, 56. In other words, if the operator of the marine vessel maneuvers it to a location, such as the location identified by reference numeral 28 or 62, the station keeping mode can be enabled and activated. Under those conditions, the control system 12 will cause the marine vessel 10 to move to its stored selected position 26 or 56 that was selected and saved at some previous time. This technique could possibly be advantageous in returning the marine vessel 10 to a desirable fishing location or to a docking position after the operator has maneuvered the marine vessel 10 into a position that is generally close to the user-selected position 26 or 56.

In the above description certain terms have been used for brevity, clearness and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. Each limitation in the appended claims is intended to invoke interpretation under 35 USC § 112(f) only the terms "means for" or "step for" are explicitly recited in the respective limitation. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A system for maintaining a marine vessel in a body of water at a selected position and a selected orientation, the system comprising:
    a proximity sensor on the marine vessel that determines a distance between a predetermined point on the marine vessel and a virtual point on an object near the marine vessel and determines a relative bearing of the predetermined point on the marine vessel with respect to the virtual point on the object;
    a marine propulsion system that produces thrust to move the marine vessel in the body of water; and
    a controller in signal communication with the proximity sensor and the marine propulsion system;
    wherein in response to receiving a position and orientation maintenance command, the controller controls the marine propulsion system to produce thrust to maintain the marine vessel at the selected position and orientation;
    wherein, in response to receiving the position and orientation maintenance command and in response to the proximity sensor sensing the virtual point on the object within a given range of the predetermined point on the marine vessel, the controller calculates thrust commands based on a difference between a selected and an actual distance between the predetermined point on the marine vessel and the virtual point on the object and based on a difference between a selected and an actual relative bearing of the predetermined point on the marine vessel with respect to the virtual point on the object; and
    wherein the controller thereafter outputs the thrust commands to the marine propulsion system, which uses the thrust commands to produce thrust to move the marine vessel to the selected distance between the predetermined point on the marine vessel and the virtual point on the object and to the selected relative bearing of the predetermined point on the marine vessel with respect to the virtual point on the object.

2. The system of claim 1, further comprising a global positioning system (GPS) on the marine vessel that determines a global position and a heading of the marine vessel with respect to Earth's geographic coordinate system;
wherein in response to receiving the position and orientation maintenance command and in response to the proximity sensor not sensing the virtual point on the object within the given range of the predetermined point on the marine vessel, the controller calculates the thrust commands based on a difference between a selected and an actual global position of the marine vessel and based on a difference between a selected and an actual heading of the marine vessel;
wherein the marine propulsion system thereafter uses the thrust commands to produce thrust to move the marine vessel to the selected global position and to the selected heading.

3. The system of claim 2, wherein the controller uses a closed-loop control algorithm to calculate the thrust commands, and wherein the controller outputs greater and quicker corrective responses when the controller is calculating the thrust commands based on the difference between the selected and the actual distance and based on the difference between the selected and the actual relative bearing than when the controller is calculating the thrust commands based on the difference between the selected and the actual global position and based on the difference between the selected and the actual heading.

4. The system of claim 1, wherein the controller does not calculate the thrust commands unless one or both of the following are true:
(a) the difference between the selected and the actual distance between the predetermined point on the marine vessel and the virtual point on the object is greater than a position error threshold; and
(b) the difference between the selected and the actual relative bearing of the predetermined point on the marine vessel with respect to the virtual point on the object is greater than an orientation error threshold.

5. The system of claim 1, wherein the predetermined point on the marine vessel is a center of gravity of the marine vessel.

6. The system of claim 1, wherein the predetermined point on the marine vessel is on an outer edge of a hull of the marine vessel.

7. The system of claim 1, further comprising a user input device that can be actuated to input the position and orientation maintenance command to the controller.

8. The system of claim 1, wherein the selected distance is an initial distance between the predetermined point on the marine vessel and the virtual point on the object upon receipt of the position and orientation maintenance command, and the selected relative bearing is an initial relative bearing of the predetermined point on the marine vessel with respect to the virtual point on the object upon receipt of the position and orientation maintenance command.

9. A method for maintaining a marine vessel in a body of water at a selected position and a selected orientation, the method comprising:
determining a distance between a predetermined point on the marine vessel and a virtual point on an object near the marine vessel;
determining a relative bearing of the predetermined point on the marine vessel with respect to the virtual point on the object;
receiving a position and orientation maintenance command;
in response to receiving the position and orientation maintenance command and in response to sensing the virtual point on the object within a given range of the predetermined point on the marine vessel, calculating thrust commands based on a difference between a selected and an actual distance between the predetermined point on the marine vessel and the virtual point on the object and based on a difference between a selected and an actual relative bearing of the predetermined point on the marine vessel with respect to the virtual point on the object; and
thereafter outputting the thrust commands to a marine propulsion system, which uses the thrust commands to produce thrust to move the marine vessel to the selected distance between the predetermined point on the marine vessel and the virtual point on the object and to the selected relative bearing of the predetermined point on the marine vessel with respect to the virtual point on the object.

10. The method of claim 9, further comprising:
determining a global position and a heading of the marine vessel with respect to Earth's geographic coordinate system; and
in response to receiving the position and orientation maintenance command and in response to not sensing the virtual point on the object within the given range of the predetermined point on the marine vessel, calculating the thrust commands based on a difference between a selected and an actual global position of the marine vessel and based on a difference between a selected and an actual heading of the marine vessel;
wherein the marine propulsion system thereafter uses the thrust commands to produce thrust to move the marine vessel to the selected global position and to the selected heading.

11. The method of claim 10, further comprising using a closed-loop control algorithm to calculate the thrust commands, and outputting greater and quicker corrective responses when calculating the thrust commands based on the difference between the selected and the actual distance and based on the difference between the selected and the actual relative bearing than when calculating the thrust commands based on the difference between the selected and the actual global position and based on the difference between the selected and the actual heading.

12. The method of claim 9, further comprising calculating the thrust commands only in response to one or both of the following being true:
(a) the difference between the selected and the actual distance between the predetermined point on the marine vessel and the virtual point on the object is greater than a position error threshold; and
(b) the difference between the selected and the actual relative bearing of the predetermined point on the marine vessel with respect to the virtual point on the object is greater than an orientation error threshold.

13. The method of claim 9, wherein the predetermined point on the marine vessel is a center of gravity of the marine vessel.

14. The method of claim 9, wherein the predetermined point on the marine vessel is on an outer edge of a hull of the marine vessel.

15. The method of claim 9, further comprising receiving the position and orientation maintenance command in response to actuation of a user input device.

16. The method of claim 9, wherein the selected distance is an initial distance between the predetermined point on the marine vessel and the virtual point on the object upon receipt of the position and orientation maintenance command, and the selected relative bearing is an initial relative bearing of the predetermined point on the marine vessel with respect to the virtual point on the object upon receipt of the position and orientation maintenance command.

17. A method for maintaining a marine vessel in a body of water at a selected position and a selected orientation, the method comprising:
    receiving a position and orientation maintenance command;
    determining if a virtual point on an object near the marine vessel is within a given range of a predetermined point on the marine vessel;
    in response to receiving the position and orientation maintenance command and in response to the virtual point on the object being within the given range of the predetermined point on the marine vessel, determining an initial relative position of the predetermined point on the marine vessel with respect to the virtual point on the object and determining an initial relative bearing of the predetermined point on the marine vessel with respect to the virtual point on the object;
    determining a subsequent relative position of the predetermined point on the marine vessel with respect to the virtual point on the object and determining a subsequent relative bearing of the predetermined point on the marine vessel with respect to the virtual point on the object;
    determining a relative position error between the initial relative position and the subsequent relative position, and determining a relative bearing error between the initial relative bearing and the subsequent relative bearing;
    calculating thrust commands based on the relative position error and the relative bearing error; and
    thereafter outputting the thrust commands to a marine propulsion system, which uses the thrust commands to produce thrust to move the marine vessel to minimize the relative position error and the relative bearing error.

18. The method of claim 17, further comprising:
    in response to receiving the position and orientation maintenance command and in response to the virtual point on the object not being within the given range of the predetermined point on the marine vessel, determining an initial global position and an initial heading of the marine vessel with respect to Earth's geographic coordinate system;
    determining a subsequent global position and a subsequent heading of the marine vessel with respect to Earth's geographic coordinate system;
    calculating the thrust commands based on a difference between the initial and the subsequent global position and based on a difference between the initial and the subsequent heading;
    wherein the marine propulsion system thereafter uses the thrust commands to produce thrust to move the marine vessel to the initial global position and to the initial heading.

19. The method of claim 17, wherein the predetermined point on the marine vessel is on an outer edge of a hull of the marine vessel.

20. The method of claim 17, further comprising receiving the position and orientation maintenance command in response to actuation of a user input device.

\* \* \* \* \*